US012154517B2

(12) United States Patent
Lim et al.

(10) Patent No.: US 12,154,517 B2
(45) **Date of Patent: *Nov. 26, 2024**

(54) GATE DRIVING CIRCUIT AND DISPLAY DEVICE USING THE SAME

(71) Applicant: LG DISPLAY CO., LTD., Seoul (KR)

(72) Inventors: Sanghyun Lim, Paju-si (KR); Nakwoo Kim, Paju-si (KR); Donghyang Lee, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/368,230

(22) Filed: Sep. 14, 2023

(65) Prior Publication Data

US 2024/0005880 A1 Jan. 4, 2024

Related U.S. Application Data

(63) Continuation of application No. 17/879,052, filed on Aug. 2, 2022, now Pat. No. 11,798,497, which is a continuation of application No. 17/137,084, filed on Dec. 29, 2020, now Pat. No. 11,436,983.

(30) Foreign Application Priority Data

Dec. 30, 2019 (KR) ........................ 10-2019-0178577

(51) Int. Cl.
*G09G 3/3291* (2016.01)
*G09G 3/3266* (2016.01)

(52) U.S. Cl.
CPC ......... *G09G 3/3291* (2013.01); *G09G 3/3266* (2013.01); *G09G 2310/0278* (2013.01); *G09G 2310/08* (2013.01)

(58) Field of Classification Search
CPC ............... G09G 3/3291; G09G 3/3266; G09G 2310/0278; G09G 2310/08
See application file for complete search history.

(56) References Cited

U.S. PATENT DOCUMENTS

| | | | | |
|---|---|---|---|---|
| 11,798,497 | B2 * | 10/2023 | Lim ..................... | G09G 3/3266 |
| 2010/0164915 | A1 | 7/2010 | Kim et al. | |
| 2018/0151146 | A1 | 5/2018 | Chang et al. | |
| 2019/0103067 | A1 | 4/2019 | Kim et al. | |
| 2019/0189052 | A1 | 6/2019 | Moon et al. | |

FOREIGN PATENT DOCUMENTS

| | | | |
|---|---|---|---|
| CN | 106409200 | A | 2/2017 |
| CN | 106486053 | A | 3/2017 |
| CN | 109935210 | A | 6/2019 |

OTHER PUBLICATIONS

Chinese Office Action dated Nov. 13, 2023 issued in Patent Application No. 202011394983.3 w/English Translation (16 pages).

* cited by examiner

*Primary Examiner* — Kenneth B Lee, Jr.
(74) *Attorney, Agent, or Firm* — POLSINELLI PC

(57) ABSTRACT

A gate driving circuit includes a Q node controller generating a voltage of a Q node by using a first clock, a second clock, a third clock, and a start signal; a QB node controller generating a voltage of a QB node by using the second clock and the third clock; and an output part including a pull-up TFT and a pull-down TFT and generating an output signal including a first pulse interval, of a gate-on voltage, synchronized with a part of the first clock according to the voltages of the Q node and the QB node.

15 Claims, 7 Drawing Sheets

FIG. 7

| | t1 | t2 | t3 | t4 | t5 | t6 | t7 | t8 | t9 | t10 |
|---|---|---|---|---|---|---|---|---|---|---|
| VST | HIGH | HIGH | LOW | LOW | LOW | HIGH | HIGH | HIGH | HIGH | HIGH |
| CLK1 | LOW | HIGH | HIGH | HIGH | LOW | LOW | LOW | HIGH | HIGH | HIGH |
| CLK2 | LOW | LOW | LOW | HIGH | HIGH | HIGH | LOW | LOW | LOW | HIGH |
| CLK3 | HIGH | HIGH | LOW | LOW | LOW | HIGH | HIGH | HIGH | LOW | LOW |
| T1/T7 | ON | ON | ON | OFF | OFF | OFF | ON | ON | ON | OFF |
| T2/T5/T8 | OFF | OFF | ON | ON | ON | OFF | OFF | OFF | ON | ON |
| T3 | ON | OFF | OFF | OFF | ON | ON | ON | OFF | OFF | OFF |
| T4/T10 | ON | ON | ON | OFF | OFF | OFF | OFF | OFF | ON | ON |
| T6/T9 | OFF | OFF | ON | ON | ON | ON | ON | ON | OFF | OFF |
| N1 | HIGH | HIGH | LOW | LOW | LOW | LOW | HIGH | HIGH | HIGH | HIGH |
| N2 | HIGH | HIGH | HIGH | HIGH | LOW | LOW | LOW | LOW | HIGH | HIGH |
| N3 | HIGH | HIGH | LOW | HIGH | HIGH | HIGH | HIGH | HIGH | LOW | HIGH |
| N4 | LOW | LOW | LOW | HIGH | HIGH | HIGH | LOW | LOW | LOW | LOW |
| Q node | HIGH | HIGH | LOW | LOW | LOW(2VGL) | LOW(2VGL) | LOW(2VGL) | LOW | HIGH | HIGH |
| QB node | LOW | LOW | LOW | HIGH | HIGH | HIGH | HIGH | HIGH | LOW | LOW |
| SCAN2(1) | HIGH | HIGH | HIGH | HIGH | LOW | LOW | LOW | HIGH | HIGH | HIGH |

GATE DRIVING CIRCUIT AND DISPLAY DEVICE USING THE SAME

CROSS-REFERENCE TO RELATED APPLICATIONS

This application is a continuation of U.S. patent application Ser. No. 17/879,052, filed on Aug. 2, 2022, which is a continuation of U.S. patent application Ser. No. 17/137,084, filed on Dec. 29, 2020, now U.S. Pat. No. 11,436,983, issued on Sep. 6, 2022, which claims the benefit of Korean Patent Application No. 10-2019-0178577 filed on Dec. 30, 2019, which are hereby incorporated by reference in their entirety.

BACKGROUND

Field of the Disclosure

The present disclosure relates to a gate driving circuit that generates overlapping scan signals and a display device using the same.

Description of the Background

The flat panel display device includes a liquid crystal display device (LCD), an electroluminescence display, a field emission display (FED), a quantum dot display device (QD) device, and the like. The electroluminescent display device is divided into an inorganic light emitting display device and an organic light emitting display device according to the material of the light emitting layer. The pixels of the organic light emitting display device include an organic light emitting diode (OLED), which is a light emitting element that emits light by itself to display an image by emitting the OLED.

The active matrix type organic light emitting diode display panel including the OLED has advantages of having high response speed, high luminous efficiency, and high luminance, and providing a wide viewing angle.

In the organic light emitting display device, the pixels including an OLED and a driving transistor are disposed in a matrix form, and luminance of an image implemented in a pixel is controlled according to gradation of image data. Depending on voltage applied between a gate electrode and a source electrode thereof, the driving transistor controls driving current flowing through the OLED. An emission amount of the OLED is determined depending on the driving current, and the luminance of the image is determined depending on the emission amount of the OLED.

The electrical characteristics of the OLED and the driving transistor have a deterioration phenomenon where luminous efficiency decreases as time passes by, and a difference in the deterioration may occur from pixel to pixel. When a variation of the deterioration occurs for each pixel, even when image data of the same gradation is applied to pixels, image quality is decreased due to the emitting of light with different luminance for each pixel.

In order to compensate for variations in electrical characteristics (i.e., threshold voltage or electron mobility of the driving transistor) between the pixels, an internal compensation method or an external compensation method that samples and compensates the threshold voltage and/or the electron mobility of the driving transistor may be applied.

Except for the driving transistors and switching transistors for supplying data voltage, the pixel circuit further includes a compensation circuit composed of a plurality of switching transistors and capacitors, wherein a plurality of scan signals may be supplied to drive the compensation circuit.

Among the scan signals, there are scan signals provided with a pulse having a length of more than one horizontal period 1H, and when supplied to pixels of two adjacent display lines, these scan signals have pulse intervals that overlap with each other.

SUMMARY

The exemplary aspects disclosed in the present disclosure take this situation into consideration, and an objective of the present disclosure is to provide a gate driving circuit generating a scan signal in which pulse intervals overlap, by using a small number of clocks.

The gate driving circuit according to an exemplary aspect includes: a Q node controller generating a voltage of a Q node by using a first clock, a second clock, a third clock, and a start signal; a QB node controller generating a voltage of a QB node by using the second clock and the third clock; and an output part including a pull-up TFT and a pull-down TFT and generating an output signal including a first pulse interval, of a gate-on voltage, synchronized with a part of the first clock according to the voltages of the Q node and the QB node.

The second clock is delayed by one horizontal period from the first clock, and the third clock is delayed by one horizontal period from the second clock; the first clock, the second clock, and the third clock have a cycle of three horizontal periods; a gate-on voltage interval is longer than a gate-off voltage interval and the gate-on voltage interval is shorter than two horizontal periods; and the start signal includes a second pulse interval synchronized with a part of the third clock.

A display device according to another exemplary aspect includes: a display panel provided with a plurality of pixels disposed thereon, the pixels being connected to data lines and gate lines, and one of the data lines and one of the gate lines; a data driving circuit for supplying a data voltage to a pixel through the data line; a gate driving circuit sequentially supplying scan signals to the pixel through a gate line including a plurality of stages connected dependently, but supplying two partially overlapping scan signals to two adjacent display lines; and a timing controller for controlling the data driving circuit and the gate driving circuit so as to display image data through the display panel.

The stage includes: a Q node controller generating a voltage of a Q node by using the first, second, and third clocks, and a start signal; a QB node controller generating a voltage of a QB node by using the second and third clocks; and an output part including a pull-up TFT and a pull-down TFT and generating a scan signal including the first pulse interval of a gate-on voltage synchronized with a part of the first clock according to the voltages of the Q node and the QB node. The second clock is delayed by one horizontal period from the first clock, and the third clock is delayed by one horizontal period from the second clock. The first, second, and third clocks have a cycle of three horizontal periods. A gate-on voltage interval is longer than a gate-off voltage interval, and the gate-on voltage interval is shorter than two horizontal periods. The start signal includes the second pulse interval synchronized with a part of the third clock.

BRIEF DESCRIPTION OF THE DRAWINGS

The accompanying drawings, which are included to provide a further understanding of the disclosure and are incorporated in and constitute a part of this specification, illustrate aspects of the disclosure and together with the description serve to explain the principles of the disclosure. In the drawings:

FIG. 7 is a view that shows on/off timing of each TFT and an output level of the main nodes.

DETAILED DESCRIPTION

Hereinafter, exemplary aspects will be described in detail with reference to the accompanying drawings.

Throughout the disclosure, the same reference numbers refer to substantially the same components. In the following description, when it is determined that a detailed description of a known function or configuration related to the contents of this disclosure may unnecessarily obscure or interfere with the understanding of the contents, the detailed description herein will be omitted.

Figure 1:
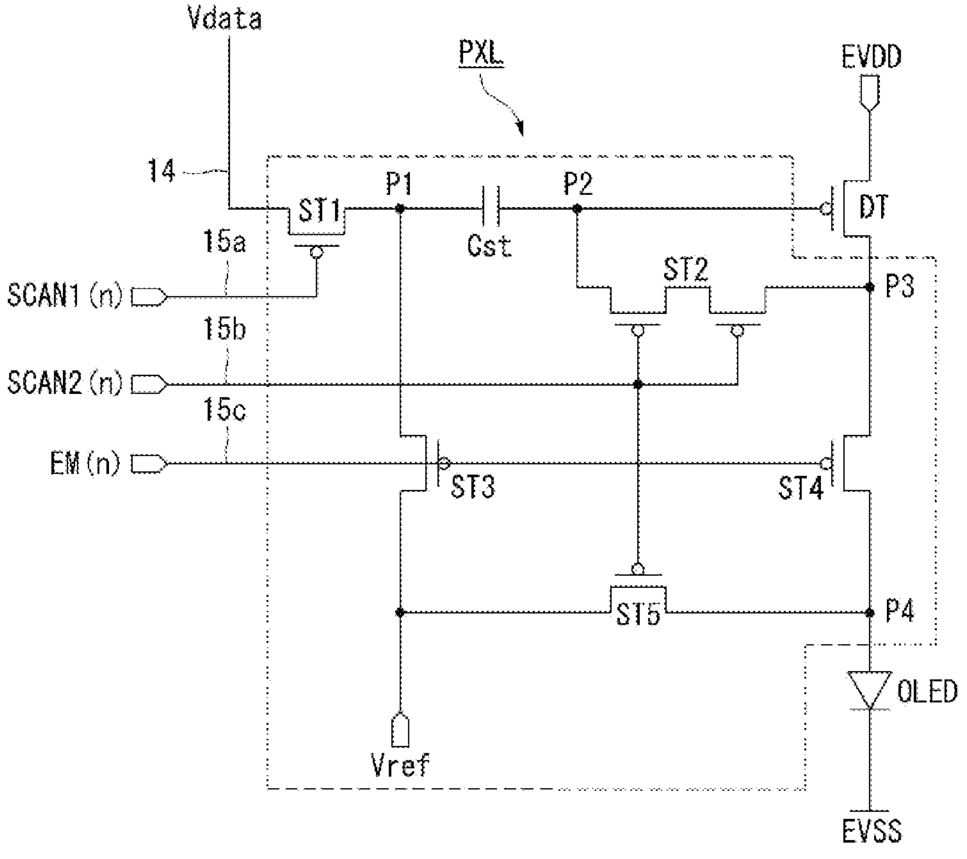
FIG. 1 is a view that shows a pixel circuit of a 6T1C structure.
Figure 2:
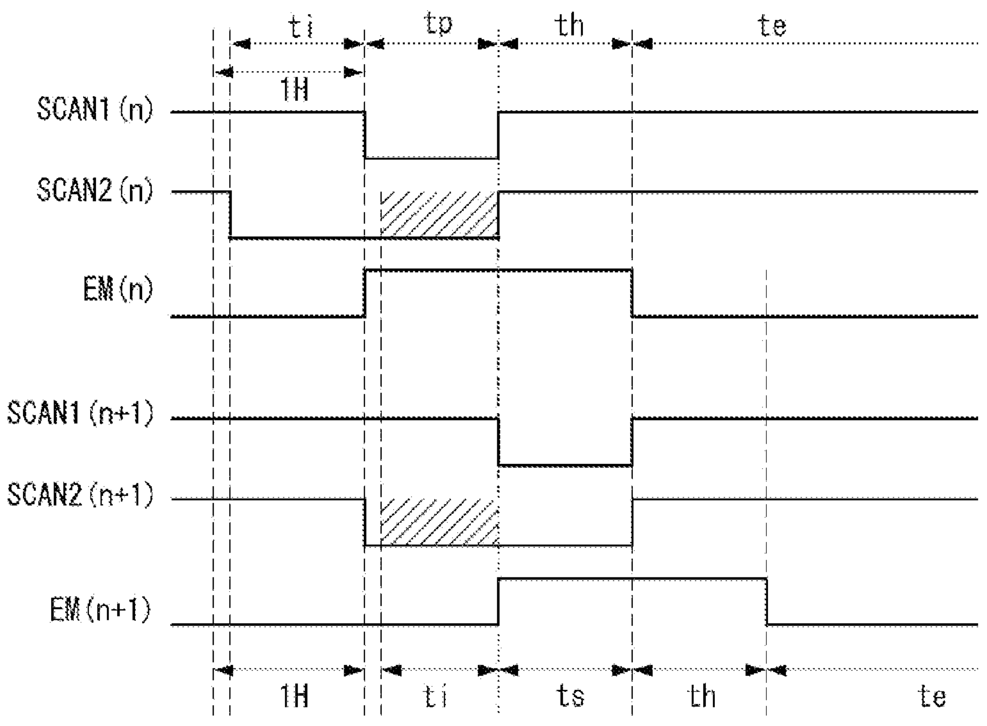
FIG. 2 is a view that shows timing of a control signal that drives the pixel circuit of FIG. 1.

FIG. 1 is a view that shows a pixel circuit of a 6T1C structure, and FIG. 2 is a view that shows timing of a control signal that drives the pixel circuit of FIG. 1.

The pixel PXL may include an OLED, a driving transistor DT, and an internal compensation circuit CC. The transistors ST1 to ST5, and DT, which are included in the pixel PXL, may be implemented as a PMOS type low temperature poly silicon (LTPS) TFT, thereby securing a desired response characteristic. For example, at least one transistor among the switch transistors ST1 to ST5 is implemented with an NMOS type or PMOS type oxide TFT having a good leakage current characteristic when turned off, and the remaining transistors may also be implemented with the PMOS type LTPS TFT having a good response characteristic.

The OLED emits light with a controlled amount of current depending on a voltage Vgs between a gate and a source of the driving transistor DT. An anode electrode of the OLED is connected to a node P4, and a cathode electrode of the OLED is connected to a low potential power supply voltage EVSS. An organic compound layer is provided between the anode electrode and the cathode electrode.

The organic compound layer may include: a hole injection layer (HIL), a hole transport layer (HTL), an emission layer (EML), an electron transport layer (ETL), and an electron injection layer (EIL), but is not limited thereto. For example, two or more organic compound layers emitting different colors may be stacked according to a tandem structure. When a current flows through an OLED, holes passing through the hole transport layer (HTL) and electrons passing through the electron transport layer (ETL) move to the emission layer (EML) to form excitons, and as a result, the emission layer (EML) may emit visible light.

The driving transistor DT is a driving element that controls the current flowing through the OLED according to the voltage Vgs between the gate and the source. In the driving transistor DT, the gate electrode is connected to a node P2, one of a first electrode and a second electrode is connected to a first power line supplying a high potential power supply voltage EVDD, and the other one is connected to a node P3. The source electrode is connected to the first power line, and the drain electrode may be connected to the node P3. The voltage Vgs between the gate and the source, of the driving transistor DT, is a voltage applied between the node P2 and the first power line.

The compensation circuit is for sampling the voltage Vgs between the gate and the source to compensate for a variation of a threshold voltage of the driving transistor DT, and may include a first to fifth switch transistors ST1 to ST5 and a storage capacitor Cst. Except for a first switch transistor ST1 for applying the data voltage Vdata of the data line 14, the remainder may be referred to as the compensation circuit.

The first switch transistor ST1 is connected between the data line 14 and a node P1, and is switched according to a first scan signal SCAN1. In the first switch transistor ST1, the gate electrode is connected to a first gate line 15*a* to which the first scan signal SCAN1 is applied, and one of the first electrode and the second electrode is connected to the data line 14 and the other one is connected to the node P1.

A second switch transistor ST2 is connected between the node P2 and the node P3, and is switched according to a second scan signal SCAN2. In the second switch transistor ST2, the gate electrode is connected to a second gate line 15*b* to which the second scan signal SCAN2 is applied, and one of the first electrode and the second electrode is connected to the node P3 and the other one is connected to the node P2.

Since a single electrode of the second switch transistor ST2 is connected to the gate electrode of the driving transistor DT, an off current characteristic should be good. Therefore, the second switch transistor ST2 may be designed as a dual gate structure so as to suppress a leakage current when turned off.

In the dual gate structure, the first gate electrode and the second gate electrode are connected to each other so as to have the same potential, and a channel length becomes longer than that of a single gate structure. As the channel length increases, resistance increases, and the leakage current decreases when turned off, thereby ensuring stability of operation. However, the second switch transistor ST2 may be implemented with the single gate structure, and in this case, the second switch transistor ST2 may be implemented with an oxide TFT.

A third switch transistor ST3 is connected between the node P1 and a reference line to which a reference voltage Vref is applied, and is switched according to an emission signal EM. In the third switch transistor ST3, the gate electrode is connected to a third gate line 15*c* to which the emission signal EM is applied, and one of the first electrode and the second electrode is connected to the node P1 and the other one is connected to the reference line.

A fourth switch transistor ST4 is connected between the node P3 and the node P4 which is an anode electrode of the OLED, and is switched according to the emission signal EM. In the fourth switch transistor ST4, the gate electrode is connected to the third gate line 15*c* to which the emission signal EM is applied, and one of the first electrode and the second electrode is connected to the node P3 and the other one is connected to the node P4.

A fifth switch transistor ST5 is connected between the node P4 and the reference line, and is switched according to the second scan signal SCAN2. In the fifth switch transistor ST5, the gate electrode is connected to the second gate line 15b to which the second scan signal SCAN2 is applied, and one of the first electrode and the second electrode is connected to the node P4 and the other one is connected to the reference line.

The storage capacitor Cst is connected between the node P1 and the node P2.

Referring to FIG. 2, each pixel PXL may be driven by being divided into an initialization period ti, a programming period tp, a holding period th, and an emission period te.

In the initialization period ti, the second scan signal SCAN2 and the emission signal EM are input as a gate low voltage VGL that is a turn-on level, and the first scan signal SCAN1 is input as a gate high voltage VGH that is a turn-off level.

In the programming period tp, the first and second scan signals SCAN1 and SCAN2 are input as the gate low voltage VGL that is the turn-on level, and the emission signal EM is input as the gate high voltage VGH that is the turn-off level.

In the holding period th, both the first and second scan signals SCAN1 and SCAN2 and the emission signal EM are input as the gate high voltage VGH that is the turn-off level.

In the emission period te, the first and second scan signals SCAN1 and SCAN2 are input as the gate high voltage VGH that is the turn-off level, and the emission signal EM is input as the gate low voltage VGL that is the turn-on level.

The initialization period ti, the programming period tp, and the holding period th may be completed within one horizontal period 1H. The one horizontal period 1H is a time allocated for the initialization, programming, and holding operation of the display line.

In the second scan signal SCAN2, the length of a pulse interval outputting the turn-on level corresponds to two horizontal periods. In the second scan signal SCAN2(*n*) supplied to the pixel of the nth display line and the second scan signal SCAN2(*n*+1) supplied to the pixel of the (n+1)th display line, the pulse interval outputting the turn-on level overlaps for one horizontal period.

In FIG. 2, the initialization period ti is set shorter than one horizontal period 1H, and the second scan signal SCAN2 may also be set shorter than two horizontal periods. In addition, although being set to be one horizontal period in FIG. 2, the holding period th may be set shorter than this period.

In the initialization period ti, the second and fifth switch transistors ST2 and ST5 are turned on in response to the second scan signal SCAN2 of the turn-on level, and the third and fourth switch transistors ST3 and ST4 are turned on in response to the emission signal EM of the turn-on level. As a result, the nodes P1, P2, P3, and P4 are all initialized to the reference voltage Vref. This initialization operation is to increase reliability of internal compensation by resetting the potentials of the nodes P1, P2, P3, and P4 to a certain value prior to the programming operation.

The reference voltage Vref is a voltage lower than the high potential power supply voltage EVDD and is set near the low potential power supply voltage EVSS to be lower than an operating point voltage Voled of the OLED. Therefore, the OLED does not emit light in the initialization period ti.

In the programming period tp, the second scan signal SCAN2 maintains the turn-on level, and the first scan signal SCAN1 is also changed to the turn-on level, so that the first, second, and fifth switch transistors ST1, ST2 and ST5 are in the turn-on states, and the emission signal EM is inverted to the turn-off level, so that the third and fourth switch transistors ST3 and ST4 are turned off.

Since a voltage (EVDD−Vref), which is a voltage between the gate and the source of the driving transistor DT set in the initialization period ti, is greater than the threshold voltage Vth of the driving transistor DT, the driving current flows through the driving transistor DT during the programming period tp. At this time, the gate electrode and the drain electrode of the driving transistor DT are connected to each other by the turn-on of the second switch transistor ST2, so that the driving transistor DT is diode-connected and the driving current flows along the diode connection path by the turn-off of the fourth switch transistor ST4. The threshold voltage Vth of the driving transistor DT is sampled by the driving current flowing along the diode connection path, and is stored in the node P2 and the node P3.

During the programming period tp, a current flow between the node P1 and the reference line is blocked by the turn-off of the third switch transistor ST3. Then, the data voltage Vdata output to the data line 14 is applied to the node P1 by the turn-on of the first switch transistor ST1.

During the programming period tp, the reference voltage Vref is continuously applied to the node P4 by the turn-on of the fifth switch transistor ST5, and the OLED does not emit light.

In the programming period tp, the potential of the node P1 is set to the data voltage Vdata, the potentials of the nodes P2 and P3 are set as (EVDD−|Vth|), and the potential of the node P4 is set as the reference voltage Vref.

In the holding period th, the first and second scan signals SCAN1 and SCAN2 are inverted from the turn-on level to the turn-off level, so that the first, second, and fifth switch transistors ST1, ST2, and ST5 are turned off. In addition, the emission signal EM maintains the turn-off level, so that the third and fourth switch transistors ST3 and ST4 maintain the turn-off states. During the holding period th, the first to fourth nodes P1, P2, P3, and P4 are all floated by the turn-off of the first to fifth switch transistors ST1 to ST5.

The holding period is to increase stability of the operation by allowing inversion timing in which the first and second scan signals SCAN1 and SCAN2 are changed from the turn-off level to the turn-on level to be advanced ahead of inversion timing in which the emission signal EM is changed from the turn-off level to the turn-on level. When the inversion timing of the first and second scan signals SCAN1 and SCAN2 and the inversion timing of the emission signal EM are the same, or when the inversion timing of the first and second scan signals SCAN1 and SCAN2 is later than the inversion timing of the emission signal EM, the sampling operation of the threshold voltage becomes unstable, and thus the holding period th is provided to prevent this instability. However, the holding period th may be omitted.

In the emission period te, the first and second scan signals SCAN1 and SCAN2 maintain the turn-off levels, so that the first, second, and fifth switch transistors ST1, ST2, and ST5 continue to be in the turn-off; and the emission signal EM is inverted to the turn-on level, so that the third and fourth switch transistors ST3 and ST4 are turned on.

In the emission period te, the reference voltage Vref is applied to the node P1 by the turn-on of the third switch transistor T3, so that the potential of the node P1 is decreased from the data voltage Vdata to the reference voltage Vref.

During the emission period te, the node P2 is floated and coupled to the node P1 through the storage capacitor Cst, so that the potential variation amount (Vdata−Vref) of the node P1 during the emission period te is applied to the node P2. As a result, compared to (EVDD−|Vth|) of the previous holding period th, the potential of the node P2 during the emission period te is decreased by (Vdata−Vref). In other words, the potential of the node P2 during the emission period te becomes (EVDD−|Vth|−Vdata+Vref).

Through this, the gate-source voltage Vgs of the driving transistor DT capable of compensating for a variation in the threshold voltage Vth of the driving transistor DT is set, and as shown in Equation 1 below, a driving current holed corresponding to the gate-source voltage Vgs flows through the driving transistor DT.

Due to this driving current holed, the potentials of the nodes P3 and P4 rise to the operating point voltage Voled of the OLED, and the OLED is turned on, and as a result, the OLED emits light by the driving current holed.

$$Ioled = K(Vgs - |Vth|)2 = K(EVDD - \{EVDD - |Vth| - Vdata + Vref\} - |Vth|)2 = K(Vdata - Vref)2 \quad \text{[Equation 1]}$$

where, K is a constant value determined by mobility, channel ratio, parasitic capacitance, etc. of the driving transistor DT, and Vth is a threshold voltage of the driving transistor DT.

As may be seen from Equation 1, the driving current holed of the OLED is not affected by the high potential power supply voltage EVDD as well as the threshold voltage Vth of the driving transistor DT.

In the present disclosure, a gate driving circuit is proposed, in which the gate driving circuit generates a scan signal overlapping each other with a small number of clocks and a simple circuit configuration when a scan signal used for an operation of initializing a pixel and sensing a threshold voltage is supplied in overlap on an adjacent display line for a certain period of time.

Figure 3:
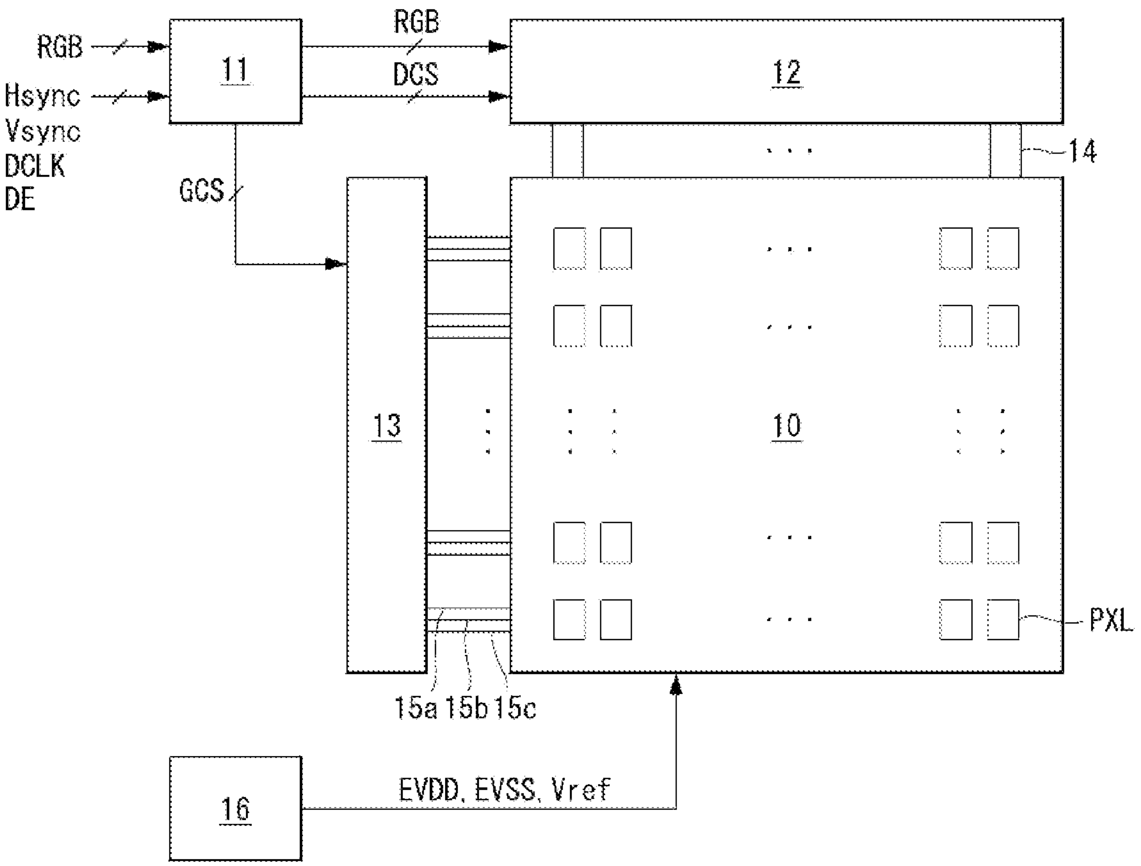
FIG. 3 is a view that shows an organic light emitting display device as a functional block.

FIG. 3 is a view that shows an organic light emitting display device as a functional block.

The display device may include a display panel 10, a timing controller 11, a data driving circuit 12, a gate driving circuit 13, and a power supply 16.

On a screen where an input image is displayed on the display panel 10, a plurality of data lines 14 disposed in a column direction (or a vertical direction or a second direction) and a plurality of gate lines 15 disposed in a row direction (or a horizontal direction or a first direction) are intersected, and pixels PXL are disposed in a matrix form for each intersection area to form a pixel array. The pixels PXL disposed on the display panel 10 may include the pixel circuit shown in FIG. 1.

The display panel 10 may further include: a first power line for supplying a pixel driving voltage or a high potential power supply voltage EVDD to the pixels PXL; a second power line for supplying a low potential power supply voltage EVSS to the pixels PXL; and a reference line for supplying the reference voltage Vref to the pixels PXL. The first and second power lines and the reference line are connected to the power supply 16.

Touch sensors may be disposed on the pixel array of the display panel 10. The touch input may be sensed using separate touch sensors or may be sensed through the pixels. As an on-cell type or an add-on type, the touch sensors are disposed on the screen AA of the display panel PXL, or may be implemented with in-cell type touch sensors embedded in the pixel array.

In the pixel array, the pixels PXL disposed on the same horizontal line are connected to any one of the data lines 14 and any one (or more) of the gate lines 15A, 15B, and 15C, thereby forming a pixel line or a display line.

In response to one or more scan signals applied through the gate line 15, the pixel PXL is electrically connected to the data line 14 to receive a data voltage, to sense a threshold voltage of a driving transistor, or to initialize each node, and may allow the OLED to emit light in response to an emission signal applied through the gate line 15. The pixels PXL disposed on the same pixel line operate simultaneously according to a scan signal and an emission signal applied from the same gate line 15.

A unit pixel serving as a reference for resolution are composed of four sub-pixels, including R sub-pixel for red color, G sub-pixel for green color, B sub-pixel for blue color, and W sub-pixel for white color. Alternatively, the unit pixel may be composed of three sub-pixels, including R sub-pixel, G sub-pixel, and B sub-pixel, but is not limited thereto. Hereinafter, a pixel may mean a sub-pixel in some cases.

The timing controller 11 supplies image data RGB transmitted from an external host system to the data driving circuit 12. In addition, the timing controller 11 receives timing signals such as a vertical synchronization signal Vsync, a horizontal synchronization signal Hsync, a data enable signal DE, and a dot clock DCLK from the host system, whereby control signals for controlling the operation timing of the data driving circuit 12 and the gate driving circuit 13 are generated. The control signals include a gate control signal GCS for controlling the operation timing of the gate driving circuit 13 and a data control signal DCS for controlling the operation timing of the data driving circuit 12.

The data driving circuit 12 samples and latches digital video data RGB input from the timing controller 11 based on the data control signal DCS to convert to parallel data, converts to an analog data voltage according to a gamma reference voltage through channels, and supplies data voltage to the pixels PXL through an output channel and the data lines 14. The data voltage may be a value corresponding to a gradation to be expressed by a pixel. The data driving circuit 12 may be composed of a plurality of source driver ICs.

Each source drive IC constituting the data driving circuit 12 may include a shift register, a latch, a level shifter, a DAC, and a buffer. The shift register shifts a clock input from the timing controller 11 to sequentially output the clock for sampling. The latch samples and latches digital video data or pixel data at a clock timing for sampling sequentially input from the shift register, and simultaneously outputs the sampled pixel data. The level shifter shifts the voltage of the pixel data input from the latch into an input voltage range of a DAC. The DAC converts and outputs pixel data from the level shifter to a data voltage based on the gamma compensation voltage. The data voltage output from the DAC is supplied to the data line 14 through the buffer.

The gate driving circuit 13 generates one or more gate signals (or scan signals) on the basis of the gate control signal GCS. For example, the first scan signal SCAN1, the second scan signal SCAN2, and the emission signal are generated and output to the pixel of FIG. 1. However, in an active period, the scan signals and emission signals are generated in a row-sequential manner to be sequentially provided to the gate lines 15 connected to each pixel line. The scan signals and emission signals of the gate line 15 are synchronized with the supply of the data voltage of the data line 14. The scan signals and emission signal swing between the gate-on voltage VGL and the gate-off voltage VGH.

The gate driving circuit 13 may be formed directly on the lower part of a substrate of the display panel 10 by a gate drive IC in panel (GIP) method, wherein the level shifter is mounted on a printed circuit board (PCB) and the shift register may be formed on the lower part of the substrate of the display panel 10. The GIP circuit may be formed on one edge of the display panel 10 outside the pixel array or on both edges thereof.

The GIP type gate driving circuit 13 includes a shift register.

Figure 4:
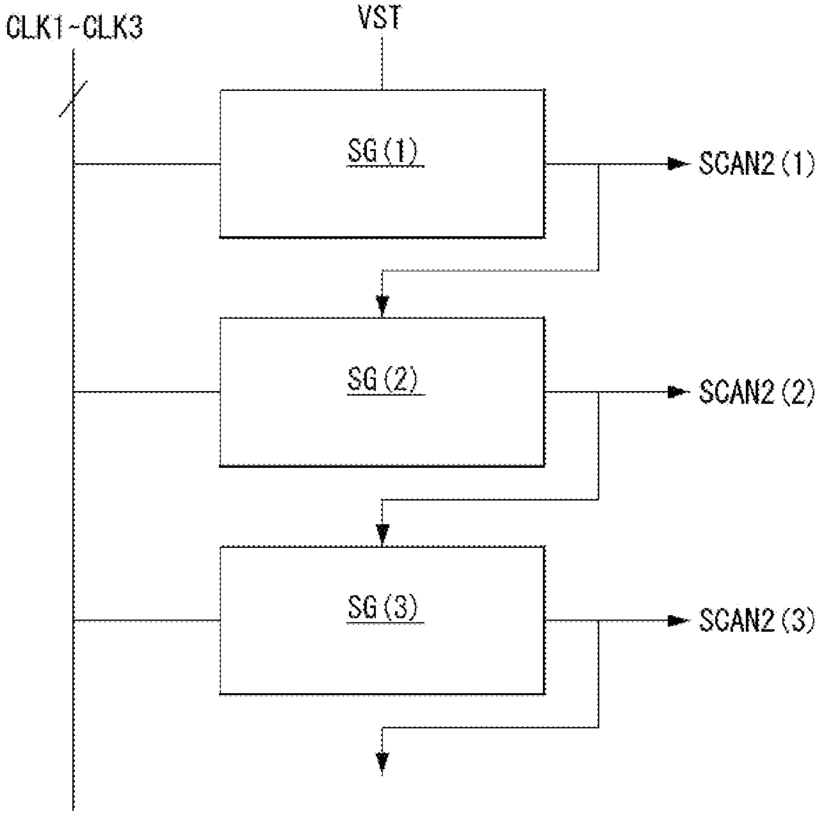
FIG. 4 is a view that shows a configuration of a shift register of a GIP circuit.

FIG. 4 is a view that shows a shift register configuration of a GIP circuit, the shift register generating the second scan signal SCAN2 of FIG. 1. The shift register includes stages SG(1) to SG(3) that are dependently connected to each other as shown in FIG. 4, wherein three consecutive stages, for example, the first to third stages, are shown in FIG. 4.

For each stage SG(1) to SG(3), the start signal VST swinging between the gate high voltage VGH and the gate low voltage VGL, and the shift clock CLK1 to CLK3 (hereinafter simply referred to as clocks), and the like may be input.

The stages SG(1) to SG(3) start outputting the second scan signal SCAN2 in response to the start signal VST, and shift the output according to the clocks CLK1 to CLK3. The second scan signals SCAN2 sequentially output from the stages SG(1) to SG(3) are supplied to the gate lines 15.

One or more of the scan signals of previous stages may be input as a start signal to at least one of next stages, and may also be input to one of the previous stages as a reset signal. The stages may output a carry signal separate from the scan signal to supply as a control signal to the previous stage or the next stage. For example, the carry signal may be supplied to the next stage as a start signal, or to the previous stage as a reset signal.

The power supply 16 controls the DC input voltage provided from a host by using a DC-DC converter to generate the gate low voltage VGL and the gate high voltage VGH required for the operation of the data driving circuit 12 and the gate driving circuit 13, and also generates the pixel driving voltage EVDD, the low potential power supply voltage EVSS, and the reference voltage Vref and the like. The reference voltage Vref may also be called an initialization voltage.

The host system may be an application processor (AP) in a mobile device, a wearable device, a virtual/augmented reality device, and the like. Alternatively, the host system may be a main board such as a television system, a set top box, a navigation system, a personal computer, and a home theater system, but is not limited thereto.

Figure 5:
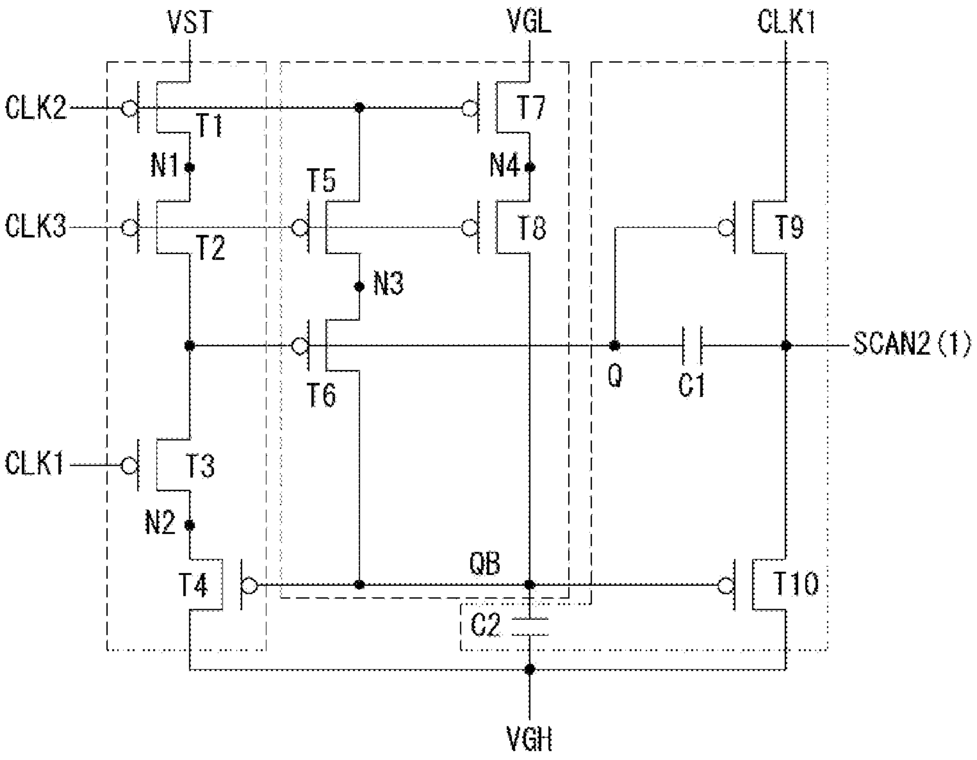
FIG. 5 is a view that shows a configuration of the GIP circuit that generates overlapping scan signals by using three clocks.
Figure 6:
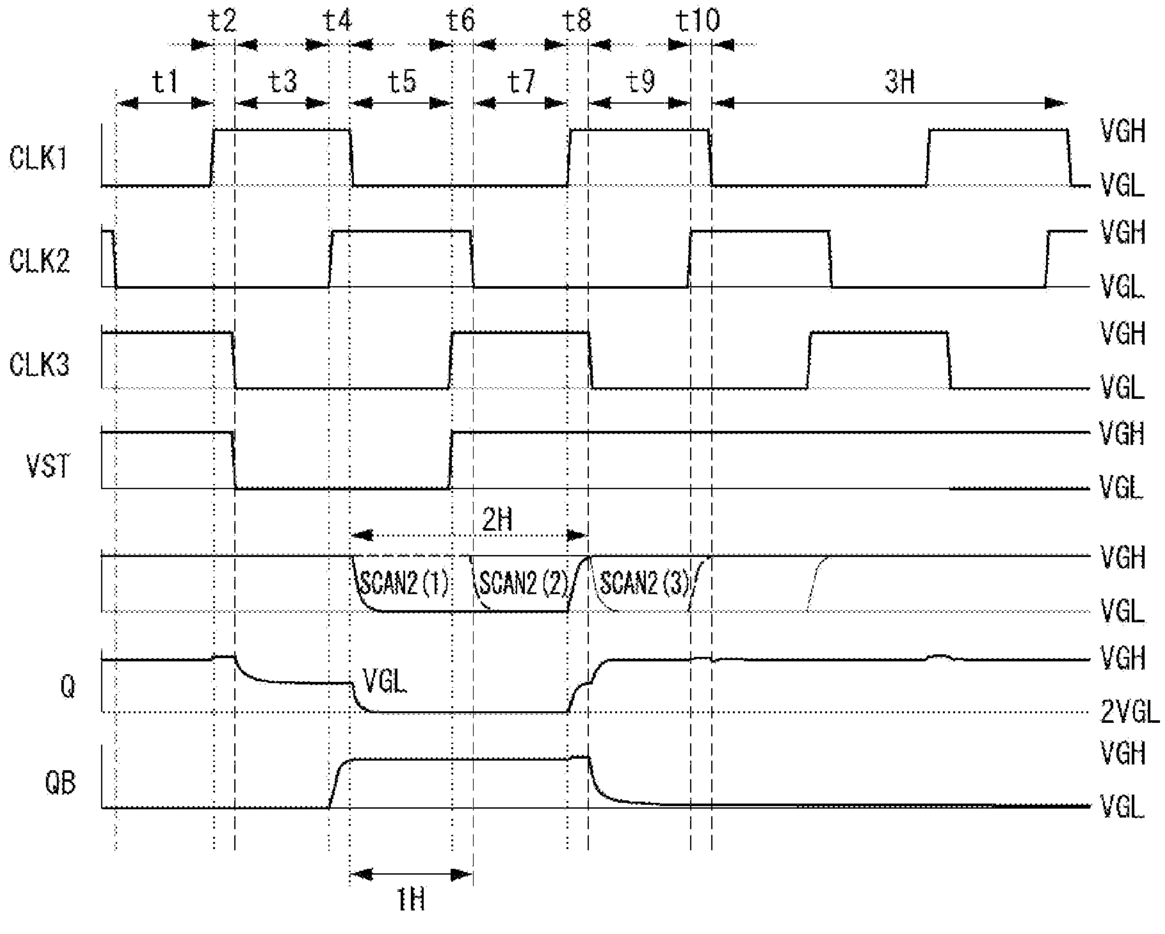
FIG. 6 is a view that shows an input signal driving the GIP circuit of FIG. 5 and an output waveform of main nodes.

FIG. 5 is a view that shows a configuration of a GIP circuit for generating overlapping scan signals by using the three clocks, and FIG. 6 is a view that shows an input signal driving the GIP circuit of FIG. 5 and output waveforms of main nodes. FIG. 7 is a view that shows on/off timing of each TFT and output levels of the main nodes.

The circuit of FIG. 5 corresponds to the first stage SG(1), receives the start signal VST from the timing controller 11, and provides a second scan signal SCAN2(1) to be supplied to pixels of the first display line.

The GIP circuit of FIG. 5 may include a first to tenth TFTs T1 to T10, a first capacitor C1, and a second capacitor C2, wherein each of the components may be largely divided into a Q node controller, a QB node controller, and an output part. Each TFT may be implemented with a p-type MOSFET.

The Q node controller is composed of the first to fourth TFTs T1 to T4, the QB node controller is composed of the fifth to eighth TFTs T5 to T8, and the output part may be composed of the ninth TFT T9, the tenth TFT T10, a first capacitor C1, and a second capacitor C2. The ninth TFT T9 and the tenth TFT T10 respectively correspond to the pull-up TFT and the pull-down TFT.

As shown in FIG. 6, the clock has a cycle of three horizontal periods 3H, and uses a three-phase shift clock in which a phase is shifted by one horizontal period 1H. Since the TFTs constituting the GIP circuit of FIG. 5 are p-type, the gate low voltage VGL corresponds to the gate-on voltage and the gate high voltage VGH corresponds to the gate-off voltage in the clock signals.

In the clock, the gate-on voltage interval which is the gate low voltage VGL is longer than the gate-off voltage interval which is the gate high voltage VGH, and is shorter than two horizontal periods 2H. In addition, in the two clocks adjacent to each other, the first length overlapping the gate-off voltage interval and the second length overlapping the gate-on voltage interval are both less than one horizontal period 1H. The sum of the first length and the second length corresponds to one horizontal period, and the second length is longer than the first length. In other words, the first length is defined as a period in which the gate-off voltage intervals of two clocks, in particular to adjacent clocks, overlap, for example CLK1 and CLK2, or CLK2 and CLK3, or CLK3 and CLK1. Correspondingly, the second length is defined as a period in which the gate-off voltage interval of one clock overlaps with the gate-on voltage interval of another clock, for example CLK1 and CLK2, or CLK2 and CLK3, or CLK3 and CLK1. The first length may correspond to t2, t4, t6, t8 and t10 in FIG. 6 and the second length may correspond to t1, t3, t5, t7 and t9 in FIG. 6.

The start signal VST is input including a gate-on voltage pulse longer than one horizontal period 1H and shorter than two horizontal periods 2H, and is input to the first stage SG1 by synchronizing the third clock CLK3 and the gate-on voltage interval.

In order to output the second scan signal SCAN2 of the first stage, the Q node controller generates a Q node voltage required to turn on the ninth TFT T9, wherein, during a scan period in which the second scan signal SCAN2 of the first stage further includes a pulse interval indicating the gate-on voltage and a predetermined period before and after the pulse interval, the Q node is to become the gate-on voltage, and during the remaining period excluding the scan period (i.e., during a non-scan period), the Q node maintains the gate-off voltage.

The Q node controller generates the Q node voltage by inputting the first, second, and third clocks CLK1, CLK2, and CLK3, the start signal VST, the gate high voltage VGH, and the voltage of the QB node.

The Q node is pre-charged with a gate-on voltage in response to the gate-on voltage of the start signal or the output signal of previous stage (or the carry signal of previous stage) under a condition of outputting the gate-on voltage of the second and third clocks CLK2 and CLK3, is bootstrapped in response to the gate-on voltage of the first clock CLK1 in this state, and is returned to the gate-off voltage in response of the gate-off voltage of the start signal or the output signal of the previous stage (or the carry signal of the previous stage) under a condition of turning on the second and third clocks CLK2 and CLK3.

That is, the Q node controller may change the voltage of the Q node from the gate-off voltage to the gate-on voltage, or may change the voltage of the Q node from the gate-on voltage to the gate-off voltage, according to a level of the start signal VST, under a condition of outputting the gate-on voltage of the second and third clocks CLK2 and CLK3.

For this operation, in the first TFT T1, the gate electrode is connected to the second clock CLK2, one of the source electrode and the drain electrode (or the first electrode and the second electrode) is connected to a start signal (or an output signal of previous stage), and the other one is connected to the first node N1. In the second TFT T2, the gate electrode is connected to the third clock CLK3, one of the source electrode and the drain electrode is connected to the first node N1, and the other one is connected to the Q node. In the third TFT T3, the gate electrode is connected to the first clock CLK1, one of the source electrode and the drain electrode is connected to the Q node, and the other one is connected to the second node N2. In the fourth TFT T4, the gate electrode is connected to the QB node, one of the source electrode and the drain electrode is connected to the second node N2, and the other one is connected to the input terminal of the gate high voltage VGH.

The QB node controller generates the QB node voltage required for the stage output to output the gate-off voltage, except for the period during which a Q node is bootstrapped. The QB node maintains the gate-on voltage, except for the period during which the Q node is bootstrapped and the period before and after the bootstrapping period (i.e., the period in which two clocks share the gate-off voltage).

The QB node controller generates the QB node voltage by inputting the second and third clocks CLK2 and CLK3, the gate low voltage VGL, and the Q node voltage.

The QB node is connected to the input terminal of the gate low voltage VGL when both the second and third clocks CLK2 and CLK3 output the gate-on voltage, so as to become the gate low voltage (i.e., the gate-on voltage). In this state, the value is maintained as long as the potential of the Q node does not change. In this state, when the potential of the Q node changes, the value is reversed in the opposite direction to the potential variation of the Q node, thereby becoming the gate high voltage.

That is, the QB node controller outputs the gate-on voltage to the QB node when the second and third clocks CLK2 and CLK3 are the gate-on voltage, outputs the gate-off voltage to the QB node when the third clock CLK3 is the gate-on voltage and the Q node is the gated-on voltage, and maintains the QB node to be at the previous state voltage when the third clock CLK3 is the gate-off voltage.

For this operation, the gate electrode of the fifth TFT T5 is connected to the third clock CLK3, one of the source electrode and the drain electrode is connected to the second clock CLK2, and the other one is connected to the third node N3. In the sixth TFT T6, the gate electrode is connected to the Q node, one of the source electrode and the drain electrode is connected to the third node N3, and the other one is connected to the QB node. In the seventh TFT T7, the gate electrode is connected to the second clock CLK2, one of the source electrode and the drain electrode is connected to the input terminal of the gate low voltage VGL, and the other one is connected to the fourth node N4. In the eighth TFT T8, the gate electrode is connected to the third clock CLK3, one of the source electrode and the drain electrode is connected to the fourth node N4, and the other one is connected to the QB node.

The output part outputs an output signal with the gate low voltage (i.e., the second scan signal SCAN2) in response to the gate low voltage of the first clock CLK1 while the Q node is pre-charged with the gate low voltage, makes the output signal to output the gate high voltage according to the bootstrapping release of the Q node, and makes the output signal to maintain the gate high voltage according to the gate low voltage of the QB node.

The output part generates the second scan signal SCAN2 by inputting the first clock CLK1, the Q node voltage, the QB node voltage, and the gate high voltage VGH.

For this operation, the gate electrode of the ninth TFT T9, which is a pull-up TFT, is connected to the Q node, one of the source electrode and the drain electrode is connected to the first clock CLK1, and the other one is connected to the output terminal. In the tenth TFT T10, which is the pull-down TFT, the gate electrode is connected to the QB node, one of the source electrode and the drain electrode is connected to the output terminal, and the other one is connected to the input terminal of the gate high voltage VGH. The first capacitor C1, which is the bootstrapping capacitor, is connected to the gate electrode of the ninth TFT T9 and the output terminal, and the second capacitor C2 is connected to the gate electrode of the tenth TFT T10 and the input terminal of the gate high voltage VGH.

FIG. 6 is a view that shows an input signal driving the GIP circuit of FIG. 5 and an output waveform of main nodes, and FIG. 7 is a view that shows on/off timing of each TFT and an output level of the main nodes.

The operation of the GIP circuit of FIG. 5 will be described in units of each period.

The first period t1 and the second period t2 correspond to a period before the start signal VST is input at the low level which is the gate-on voltage.

The first period t1 is a period in which the first clock CLK1 and the second clock CLK2 share a low level which is the gate-on voltage. The period in which two clocks share the low level is provided to be longer than a period in which two clocks share a high level which is the gate-off voltage.

In the first period t1, the start signal VST is a high level which is the gate-off voltage, and the third clock is a high level that is the gate-off voltage. Accordingly, the first, third, and seventh TFTs T1, T3, and T7 are turned on, and the second, fifth, and eighth TFTs T2, T5, and T8 are turned off, and the first and fourth nodes N1 and N2 respectively become the high level and the low level.

At this time, the third node N3 maintains the high level which is the previous state, and the QB node maintains the low level which is the previous state. The sixth and ninth TFTs T6 and T9 are turned off by the high-level Q node, the fourth and tenth TFTs T4 and T10 are turned on by the low-level QB node, the second node N2 and the output terminal output the high level, and the Q node also maintains the same high level as the second node N2 by the third TFT T3 in the turn-on state.

The second period t2 is a period in which the first clock CLK1 is changed from the low level to the high level, so that the first clock CLK1 and the third clock CLK3 share the high level, and the second period t2 in which two clocks share the high level is provided to be shorter than the first period t1 in which the two clocks share the low level.

In the second period t2, the start signal VST is at the high level, and the second clock CLK2 maintains at the low level. Accordingly, the first and seventh TFTs T1 and T7 maintain the turn-on states; the second, fifth, and eighth TFTs T2, T5, and T8 maintain the turn-off states; the third TFT T3 is turned off; and the first and fourth nodes N1 and N4 respectively maintain the high and low levels.

At this time, the third node N3 maintains the high level which is the previous state, and the Q node and the QB node also respectively maintain the high level and the low level which are the previous states. The sixth and ninth TFTs T6 and T9 maintain the turn-off states by the high-level Q node, and the fourth and tenth TFTs T4 and T10 are turned on by the low-level QB node, so that the second node N2 and the output terminal maintain the high levels.

The third period t3 is a period in which the third clock CLK3 is changed from the high level to the low level so that the second clock CLK2 and the third clock CLK3 share the low level, and the first clock CLK1 and the third clock CLK3 are longer than the second period t2 which shares the high level and have the same length as that of the first period t1.

In the third period t3, the start signal VST is changed from the high level to the low level, and the first clock CLK1 maintains the high level. Accordingly, the first and seventh TFTs T1 and T7 maintain the turn-on states; and the second, fifth, and eighth TFTs T2, T5, and T8 are changed from the turn-off states to the turn-on states; and the third TFT T3 maintains the turn-off state.

In the third period t3, the first and second TFTs T1 and T2 are turned on so that the first node N1 and the Q node are charged to the low level of the start signal VST, the sixth and ninth TFTs T6 and T9 are turned on by the low-level Q node, the low level of the second clock CLK2 is charged to the third node N3 and the QB node by the fifth and sixth TFTs T5 and T6 in the turn-on state. Alternatively, the low level of the gate low voltage VGL is applied to the fourth node N4 and the QB node by the seventh and eighth TFTs T7 and T8 in the turn-on state, whereby the state is maintained because the QB node is at the low level even in the previous second period t2.

At this time, the fourth and tenth TFTs T4 and T10 maintain the turn-on state by the QB node maintaining the low level, so that the second node N2 and the output terminal maintain the high levels.

That is, in the third period t3, the low-level second and third clocks CLK2 and CLK3 turns on the first and second TFTs T1 and T2, so that the Q node is charged (i.e., pre-charged) with the low-level start signal VST, and accordingly, the scan period is entered. However, the QB node is still maintained in the low-level state.

The fourth period t4 is a period in which the second clock CLK2 is changed from the low level to the high level, so that the first clock CLK1 and the second clock CLK2 share the high level, and the fourth period t4 has the same length as that of the second period t2 and is provided to be shorter than the third period t3.

In the fourth period t4, the third clock CLK3 and the start signal VST maintain the low levels. The first and seventh TFTs T1 and T7 are changed from the turn-on state to the turn-off state; the second, fifth, and eighth TFTs T2, T5, and T8 are maintained in the turn-on state; and the third TFT T3 maintains the turn-off state.

In the fourth period t4, since the first TFT T1 is turned off, the first node N1 maintains the same low level as the Q node by the second TFT T2 in the turn-on state; the sixth and ninth TFTs T6 and T9 are turned on by the low-level Q node; the high level of the second clock CLK2 is charged to the third node N3 and the QB node by the fifth and sixth TFTs T5 and T6 in the turn-on state, thereby changing the QB node from the low level to the high level; the output terminal maintains the high level of the first clock CLK1 by the ninth TFT T9 in the turn-on state; and the fourth node N4 is to be at the same high level as the QB node by the eighth TFT T8 in the turn-on state. The fourth and tenth TFTs T4 and T10 are turned off by the high-level QB node, and accordingly, the second node N2 maintains the previous high level.

That is, in the fourth period t4, the Q node maintains the previous low level, and the QB node is changed from the low level to the high level.

The fifth period t5 is a period in which the first clock CLK1 is changed from the high level to the low level so that the first clock CLK1 and the third clock CLK3 share the low level, and the fifth period t5 has the same length as that of the third period t3 and is provided to be longer than the fourth period t4.

In the fifth period t5, the start signal VST maintains the low level, and the second clock CLK2 maintains the high level. According to the transition of the first clock CLK1, the fourth TFT T4 is changed from the turn-off state to the turn-on state, the first and seventh TFTs T1 and T7 maintain the turn-off states by the high-level second clock CLK2, and the second, fifth, and eighth TFTs T2, T5, and T8 maintain the turned-on states by the low-level third clock CLK3.

In the fifth period t5, as the first clock CLK1 connected to the source electrode or the drain electrode of the ninth TFT T9 is changed from the high level to the low level, the Q node, which is at the lower level by being connected to the gate of the ninth TFT T9, is bootstrapped with the voltage lower than the gate low voltage VGL, that is, 2 VGL. The QB node maintains the high level of the second clock CLK2 by the fifth and sixth TFTs T5 and T6 in the turn-on state, the first node N1 maintains the low level, the second node N2 is changed from the high level to the low level, the third node N3 maintains the high level, and the fourth node N4 maintains the high level.

That is, in the fifth period t5, the Q node is bootstrapped, the QB node maintains the high level, and the output terminal starts outputting the low-level second scan signal SCAN2 which is the gate-on voltage.

The sixth period t6 is a period in which the third clock CLK3 is changed from the low level to the high level, so that the second clock CLK2 and the third clock CLK3 share the high level, and the sixth period t6 has the same length as that of the fourth period t4 and is provided to be shorter than the fifth period t5.

In the sixth period t6, the start signal VST is changed from the low level to the high level, and the first clock maintains the low level. The second, fifth, and eighth TFTs T2, T5, and T8 are changed from the turn-on state to the turn-off state according to the transition of the third clock CLK3; the first and seventh TFTs T1 and T7 maintain the turn-off states; and the third TFT T3 maintains the turn-on state.

The QB node is floated by the fifth and eighth TFTs T5 and T8 which are in the turn-off state to maintain the high level, and the Q node is also floated by the fourth TFT T4 which is in the turn-off state by the QB node and by the second TFT T2 which is in the turn-off state, but maintains the bootstrapping state by the ninth TFT T9 and the first clock CLK1. All of the first, second, third, and fourth nodes N1, N2, N3, and N4 are also floated to respectively maintain the low level, low level, high level, and high level, which are the previous states.

In the sixth period t6, the Q node maintains the bootstrapping state and the output terminal continues to output the low-level second scan signal SCAN2.

The seventh period t7 is a period in which the second clock CLK2 is changed from the high level to the low level, so that the first clock CLK1 and the second clock CLK2 share the low level, and the seventh period t7 has the same length as that of the fifth period t5 and is provided to be longer than the sixth period t6.

In the seventh period t7, the start signal VST maintains the high level, and the third clock maintains the high level.

According to the transition of the second clock CLK2, the first and seventh TFTs T1 and T7 are changed from the turn-off state to the turn-on state; and the second, fifth, and eighth TFTs T2, T5, and T8 maintain the turn-off states, and the third TFT T3 maintains the turn-on state.

The QB node is still floated to maintain the high level. While maintaining the floating state and maintaining the bootstrapping state, the Q node also maintains a state of voltage lower than the gate low voltage. The first node N1 is changed from the low level to the high level by the first TFT T1 which is turned on, the fourth node N4 is also changed from the high level to the low level by the seventh TFT T7 which is turned on, and the second node N2 and the third node N3 respectively maintain the low state and the high state, which are the previous states.

That is, in the seventh period t7, the Q node maintains the bootstrapping state, and the output terminal also continues to output the low-level second scan signal SCAN2.

The eighth period t8 is a period in which the first clock CLK1 is changed from the low level to the high level, so that the first clock CLK1 and the third clock CLK3 share the high level, and the eighth period t8 has the same length as that of the sixth period t6 and is provided to be shorter than the seventh period t7.

In the eighth period t8, the start signal VST maintains the high level, and the second clock maintains the low level. According to the transition of the first clock CLK1, the third TFT T3 is changed from the turn-on state to the turn-off state; the first and seventh TFTs T1 and T7 maintain the turn-on states; and the second, fifth, and eighth TFTs T2, T5, and T8 maintain the turn-off states.

The QB node is still floated to maintain the high level, whereas, even though the Q node maintains the floating state, since the first clock CLK1 is changed from the low level to the high level, the Q node is not bootstrapped, but is changed from 2VGL lower than the low level to VGL which is the low level. According to the change of the Q node, the output terminal outputs the high-level second scan signal SCAN2. All of the first to fourth nodes N1 to N4 maintain the previous states.

That is, in the eighth period t8, the Q node is released from the bootstrapping state, and the output terminal stops outputting the pulse of the gate-on voltage and outputs the high level.

The ninth period t9 is a period in which the third clock CLK3 is changed from the high level to the low level, so that the second clock CLK2 and the third clock CLK3 share the low level, and the ninth period t9 has the same length as that of the seventh period t7 and is provided to be longer than the eighth period t8.

In the ninth period t9, the start signal VST maintains the high level, and the first clock CLK1 maintains the high level. According to the transition of the third clock CLK3, the second, fifth, and eighth TFTs T2, T5, and T8 are changed from the turn-off state to the turn-on state, and the first and seventh TFTs T1 and T7 maintain the turn-on states, and the third TFT T3 maintains the turn-off state.

According to the turn-ons of the first and second TFTs T1 and T2, and the seventh and eighth TFTs T7 and T8, the Q node and the QB node are respectively connected to the input terminals of the high-level start signal VST and the gate low voltage VGL, whereby the Q node is changed from the low level to the high level and the QB node is changed from the high level to the low level. By the QB node changing to the low level, the fourth and tenth TFTs T4 and T10 are changed from the turn-off state to the turn-on state, whereby the second node N2 is changed from the low level to the high level and the output terminal continues to output the low-level second scan signal SCAN2. The first node N1 maintains the high level, the third node N3 is also changed from the high level to the low level by the fifth TFT T5 which is turned on, and the fourth node N4 maintains the low level.

That is, in the ninth period t9, the Q node is changed from the low level to the high level, and the QB node is changed from the high level to the low level.

The tenth period t10 is a period in which the second clock CLK2 is changed from the low level to the high level, so that the first clock CLK1 and the second clock CLK2 share the high level, and the tenth period t10 has the same length as that of the eighth period t8 and is provided to be shorter than the ninth period t9.

In the tenth period t10, the start signal VST maintains the high level, and the third clock CLK3 maintains the low level. According to the transition of the second clock CLK2, the first and seventh TFTs T1 and T7 are changed from the turn-on state to the turn-off state; and the second, fifth, and eighth TFTs T2, T5, and T8 maintain the turn-on states, and the third TFT T3 maintains the turn-off state.

In the tenth period t10, according to the turn-off of the first and third TFTs T1 and T3, the Q node is floated to maintain the high level, which is the previous state, and the QB node is also floated, thereby maintaining the low level, which is the previous state. The fourth and tenth TFTs T4 and T10 maintain the turn-on states by the low level of the QB node, so that the second node N2 and the output terminal maintain the high levels. The first node N1 also maintains the high level which is the previous state, the third node N3 is changed from the low level to the high level, and the fourth node N4 maintains the low level.

The Q node is at the high level for the first, second, ninth, and tenth periods t1, t2, t9, and t10; maintains the low level from the third period t3 to the eighth period t8; in particular, is bootstrapped during the fifth period t5 to the seventh period t7 to become 2VGL level lower than the low level of VGL. The period during which the Q node maintains the low level corresponds to three horizontal periods.

The output terminal outputs the low-level second scan signal SCAN2 corresponding to the gate-on voltage during the fifth period t5 to the seventh period t7 when the Q node is bootstrapped. The low-level pulse interval of the second scan signal SCAN2 is shorter than two horizontal periods, and is shorter by the first length in which the gate-off voltage intervals of two clocks overlap. As a result, the low-level pulse of the second scan signal SCAN2 is synchronized with the first clock CLK1.

The QB node is at the high level for the first to third periods t1 to t3, and the ninth period t9 and the tenth period t10; and maintains the high level for the fourth to eighth periods t4 to t8.

FIGS. 5 and 6 are views that show the first stage that supplies the second scan signal SCAN2 to pixels of the first display line. In the first stage, the start signal VST having the pulse of the gate-on voltage synchronized with the third clock CLK3 is input as the start pulse; the clocks are input in the order of the first clock CLK1, the second clock CLK2, and the third clock CLK3; and an output signal having the gate-on voltage pulse synchronized with the first clock CLK1, that is, the second scan signal SCAN2(1) is output.

In the second stage, the second scan signal SCAN2(1), which is an output of the first stage, is input as a start signal, wherein the start signal has a pulse of the gate-on voltage synchronized with the first clock CLK1, and is input in the order of the second clock CLK2, the third clock CLK3, and first clock CLK1; and an output signal having the pulse of the gate-on voltage synchronized with the second clock CLK2, that is, the second scan signal SCAN2(2) is output.

In the third stage, the second scan signal SCAN2(2), which is an output of the second stage, is input as a start signal, wherein the start signal has a pulse of the gate-on voltage synchronized with the second clock CLK2, and is input in the order of the third clock CLK3, the first clock CLK1, and the second clock CLK2; and an output signal having the pulse of the gate-on voltage synchronized with the third clock CLK3, that is, the second scan signal SCAN2 (3) is output.

The fourth stage has the same input, output, and operation as the first stage.

In FIG. 6, in the output of the first stage SCAN2(1) and the output of the second stage SCAN2(2), the gate-on voltage intervals overlap each other by the second length in which two clocks overlap in the gate-on voltage intervals, likewise, in the output of the second stage SCAN2(2) and the output of the third stage SCAN2(3), the gate-on voltage intervals also overlap each other by the second length in which two clocks overlap in the gate-on voltage intervals.

Accordingly, the second scan signal SCAN2 in FIG. 2 may be generated by applying the GIP circuit of FIG. 5 to the stage of FIG. 4.

In this way, it is possible to generate a scan signal that partially overlaps, by a simple structure using only three clocks. In addition, in the pixel circuit of the 6T1C structure as shown in FIG. 1, the pixels may be initialized in an interval overlapping with the previous display line, and accordingly, the entire one horizontal period may be used as a period for programming of data, whereby data may be written in sufficient time for the pixel.

The gate driving circuit and the display device described in the disclosure is as follows.

The gate driving circuit according to an exemplary aspect includes: a Q node controller generating a voltage of a Q node by using a first clock, a second clock, a third clock, and a start signal; a QB node controller generating a voltage of a QB node by using the second clock and the third clock; and an output part including a pull-up TFT and a pull-down TFT and generating an output signal including a first pulse interval, of a gate-on voltage, synchronized with a part of the first clock according to the voltages of the Q node and the QB node.

The second clock is delayed by one horizontal period from the first clock, and the third clock is delayed by one horizontal period from the second clock; the first clock, the second clock, and the third clock have a cycle of three horizontal periods; a gate-on voltage interval is longer than a gate-off voltage interval and the gate-on voltage interval is shorter than two horizontal periods; and the start signal may include a second pulse interval synchronized with a part of the third clock.

In an exemplary aspect, the second pulse interval of the start signal is synchronized with one of the gate-on voltage intervals of the third clock, and the first pulse interval of the output signal is synchronized with the gate-on voltage interval, of the first clock, starting during the second pulse interval.

In the exemplary aspect, the first pulse interval of the output signal is shorter than the two horizontal periods by a length of overlapping the gate-off voltage interval of two clocks among the first clock, the second clock, and the third clock.

In the exemplary aspect, the Q node controller outputs the gate-on voltage to the Q node from when the second pulse starts until the third clock is changed from the gate-off voltage interval to the gate-on voltage interval after the start signal is changed to a gate-off voltage.

In the exemplary aspect, when a second TFT and a third TFT are in the gate-on voltage interval at a same time, the Q node controller changes the voltage of the Q node from the gate-off voltage to the gate-on voltage or from the gate-on voltage to the gate-off voltage, according to the level of the start signal.

In the exemplary aspect, the Q node connected to the gate electrode of the pull-up TFT is bootstrapped in synchronization with the gate-on voltage interval of the first clock supplied to the pull-up TFT, and is changed to have a voltage lower than the gate-on voltage.

In the exemplary aspect, the QB node controller outputs the gate-on voltage to the QB node when the second clock and the third clock are the gate-on voltage intervals, outputs the gate-off voltage to the QB node when the third clock is the gate-on voltage interval and the Q node is the gate-on voltage interval, and maintains the QB node to have a voltage in a previous state when the third clock is the gate-off voltage interval.

In the exemplary aspect, the output part outputs the output signal to the first pulse interval when the first clock is input to the gate-on voltage interval while the Q node controller outputs the gate-on voltage to the Q node.

In the exemplary aspect, the Q node controller may include: a first TFT having a gate electrode connected to the second clock and having a first electrode connected to the start signal; a second TFT having a gate electrode connected to the third clock, having a first electrode connected to a second electrode of the first TFT, and having a second electrode connected to the Q node; a third TFT having a gate electrode connected to the first clock and having a first electrode connected to the Q node; and a fourth TFT having a gate electrode connected to the QB node, having a first electrode connected to a second electrode of the third TFT, and having a second electrode connected to an input terminal of a gate-off voltage.

In the exemplary aspect, the QB node controller may include: a fifth TFT having a gate electrode connected to the third clock and having a first electrode connected to the second clock; a sixth TFT having a gate electrode connected to the Q node, having a first electrode connected to a second electrode of the fifth TFT, and having a second electrode connected to the QB node; a seventh TFT having a gate electrode connected to the second clock and a first electrode connected to an input terminal of the gate-on voltage; and an eighth TFT having a gate electrode connected to the third clock, having a first electrode connected to a second electrode of the seventh TFT, and having a second electrode connected to the QB node.

In the exemplary aspect, the pull-up TFT having a gate electrode connected to the Q node and having a first electrode connected to the first clock; a first capacitor connected to the Q node and a second electrode of the pull-up TFT; the pull-down TFT having a gate electrode connected to the QB node, having a first electrode connected to the second electrode of the pull-up TFT, and having a second electrode connected to the input terminal of the gate-off voltage; and a second capacitor connected to the gate electrode of the pull-down TFT and the second electrode of the pull-down TFT.

A display device according to another exemplary aspect includes: a display panel provided with a plurality of pixels disposed thereon and connected to data lines and gate lines, and one of the data lines and one of the gate lines; a data driving circuit for supplying a data voltage to the pixels through the data line; a gate driving circuit for sequentially supplying scan signals to the pixels through the gate line by including a plurality of stages connected dependently, but supplying two partially overlapping scan signals to two adjacent display lines; and a timing controller for controlling the data driving circuit and the gate driving circuit so as to display image data through the display panel.

The stage includes: a Q node controller generating a voltage of a Q node by using a first clock, a second clock, a third clock, and a start signal; a QB node controller generating a voltage of a QB node by using the second clock and the third clock; and an output part including a pull-up TFT and a pull-down TFT and generating a scan signal including a first pulse interval, of a gate-on voltage, synchronized with a part of the first clock according to the voltages of the Q node and the QB node. The second clock is delayed by one horizontal period from the first clock, and the third clock is delayed by one horizontal period from the second clock; the first clock, the second clock, and the third clock have a cycle of three horizontal periods; a gate-on voltage interval is longer than a gate-off voltage interval and the gate-on voltage interval is shorter than two horizontal periods; and the start signal includes a second pulse interval synchronized with a part of the third clock.

As described above, the driving circuit according to the present disclosure may use a small number of input clocks and generate scan signals overlapping each other with a small number of TFTs, thereby reducing the bezel area. In addition, it is possible to initialize in the interval overlapping with the output of the previous display line, so that the entire one horizontal period may be used for the data program, thereby stably writing data to the pixel.

Through the above description, those skilled in the art will appreciate that various changes and modifications are possible without departing from the technical spirit of the present disclosure. Therefore, the technical scope of the present disclosure is not limited to the contents described in the detailed description of the disclosure, but should be determined by the scope of the claims.

Although aspects have been described with reference to a number of illustrative aspects thereof, it should be understood that numerous other modifications and aspects can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An organic light emitting device comprising:

a gate driving circuit including a first TFT (thin film transistor) receiving a first clock, a second TFT receiving a second clock, and a third TFT receiving a third clock, at least two of the first clock, the second clock and the third clock having a different waveform, at least part of an on level of the first clock overlapping with the second clock and the third clock, at least part of an on level of the second clock partially overlapping with the first clock and the third clock, and at least part of an on level of the third clock partially overlapping with the first clock and the second clock; and a pixel circuit electrically connected with the gate driving circuit, the pixel circuit including a driving TFT, at least one switching TFT including an oxide TFT, and an OLED (organic light emitting diode).

2. The organic light emitting device of claim 1, wherein the gate driving circuit further comprises a fourth TFT having a gate electrode connected to a Q node, one of a source electrode and a drain electrode of the fourth TFT being connected to the first clock, and another one of the source electrode and the drain electrode being connected to an output terminal.

3. The organic light emitting device of claim 2, wherein the gate driving circuit further comprises a capacitor connected between the gate electrode and the other of the source electrode and the drain electrode of the fourth TFT.

4. The organic light emitting device of claim 2, wherein the Q node is further connected to the third TFT.

5. The organic light emitting device of claim 1, wherein the OLED comprises an anode electrode, a cathode electrode, and a light emitting layer.

6. The organic light emitting device of claim 5, wherein the light emitting layer comprises at least one of a hole injection layer, a hole transport layer, an emission layer, an electron transport layer, and an electron injection layer.

7. The organic light emitting device of claim 6, wherein when a current flows through the OLED, holes passing through the hole transport layer and electrons passing through the electron transport layer move to the emission layer such that form excitons and the emission layer emits visible light.

8. The organic light emitting device of claim 5, wherein the OLED comprises two or more organic compound layers emitting different colors and stacked according to a tandem structure.

9. The organic light emitting device of claim 1, wherein in two of the first clock, the second clock, and the third clock that are adjacent to each other, a first length overlapping a gate-off voltage period and a second length overlapping a gate-on voltage period are less than one horizontal period.

10. The organic light emitting device of claim 9, wherein a sum of the first length and the second length corresponds to the one horizontal period.

11. The organic light emitting device of claim 9, wherein the second length is longer than the first length.

12. The organic light emitting device of claim 9, wherein a turn-on level interval is longer than a turn-off level interval and shorter than two horizontal periods.

13. The organic light emitting device of claim 1, wherein the second TFT receives a start signal including a pulse interval synchronized with a part of the third clock.

14. The organic light emitting device of claim 1, wherein a pulse interval, of a gate-on voltage, of an output signal output from the gate driving circuit to the pixel circuit is synchronized with at least part of the first clock.

15. The organic light emitting device of claim 14, wherein the pulse interval of the output signal is shorter than two horizontal periods by a length of overlapping with a turn-off level interval of two clocks among the first clock, the second clock, and the third clock.

* * * * *